| United States Patent [19] | [11] Patent Number: 6,046,867 |
| Rana | [45] Date of Patent: Apr. 4, 2000 |

[54] COMPACT, LIGHT-WEIGHT OPTICAL IMAGING SYSTEM AND METHOD OF MAKING SAME

[75] Inventor: Shahida Rana, Fremont, Calif.

[73] Assignee: Hewlett-Packard Company, Palo Alto, Calif.

[21] Appl. No.: 09/300,005

[22] Filed: Apr. 26, 1999

[51] Int. Cl.[7] .................................................. G02B 5/04
[52] U.S. Cl. .......................... 359/831; 359/832; 359/833; 359/834
[58] Field of Search ..................................... 359/831, 832, 359/833, 834; 250/201.7

[56] References Cited

U.S. PATENT DOCUMENTS

| 5,212,375 | 5/1993 | Goto et al. ............................. 250/201.7 |
| 5,446,710 | 8/1995 | Gardner et al. ....................... 369/44.14 |
| 5,450,237 | 9/1995 | Yoshida et al. ......................... 359/562 |

*Primary Examiner*—Cassandra Spyrou
*Assistant Examiner*—Mohammad Sikder
*Attorney, Agent, or Firm*—Ian Hardcastle

[57] ABSTRACT

A compact optical imaging system that transmits light received from an object located at an image plane to an exit pupil to form an image comprises a first prism, a second prism, a converging reflective element, and a converging transmissive element. The first prism includes a first face, a second face, and a third face that faces the image plane. The included angle between the first face and the second face of the first prism is α. The second prism includes a first face facing the exit pupil and substantially parallel to the first face of the first prism, and a second face adjacent the second face of the first prism. The converging reflective element is adjacent the first face of the first prism. The converging transmissive element is on or adjacent the first face of the second prism. The included angle α between the first face and the second face of the first prism lies in a range in which light originating at the exit pupil passes through the converging transmissive element, the second prism and the first prism, is reflected by the converging reflective element back into the first prism, is reflected at the second face of the first prism, is totally internally reflected at the first face of the first prism, and passes through the third face of the first prism to the image plane.

22 Claims, 8 Drawing Sheets

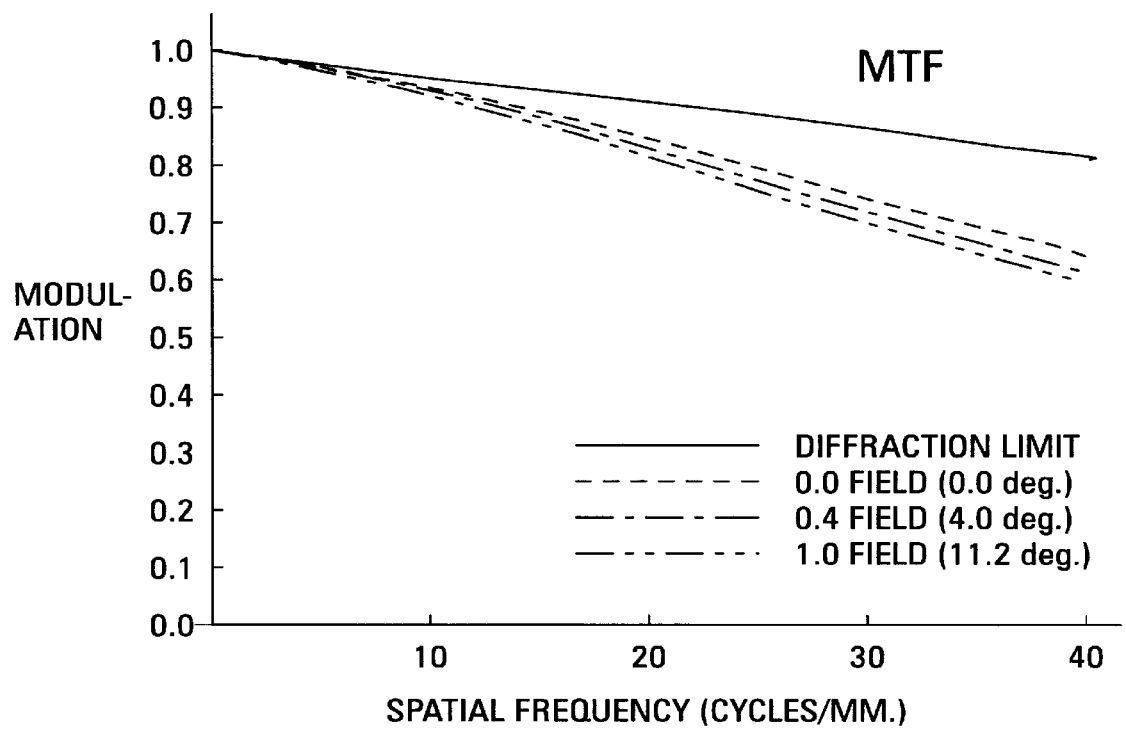
FIG.7A
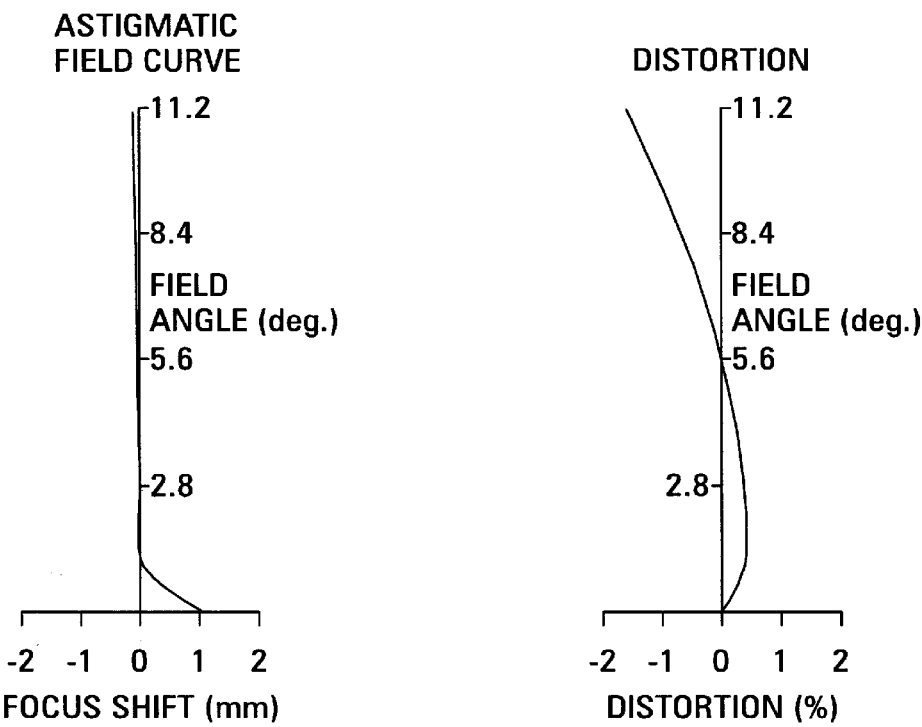
FIG.7B
FIG.7C

COMPACT, LIGHT-WEIGHT OPTICAL IMAGING SYSTEM AND METHOD OF MAKING SAME

FIELD OF THE INVENTION

The invention relates to an optical imaging system that forms an image of an object located in an image plane, and particularly relates to a compact optical imaging system composed of a small number of parts that are easily aligned relative to one another.

BACKGROUND OF THE INVENTION

Many optical instruments and optical systems include imaging systems that gather light from an object and direct the light into the human eye to enable the eye to perceive an image of the object. Desirable properties of such imaging systems include high image brightness, high image resolution, low geometric and chromatic aberrations, low distortion, a wide field of view, and an adequate and non-critical eye relief. It is also desirable that an imaging system be simple and easy to manufacture, and that any adjustments of its components be simple and easy to perform. Finally, it is desirable that the imaging system be capable of adjustment to provide sharply-focused images for users with vision defects such as myopia and presbyopia. Meeting the above-stated performance criteria is relatively easy when no constraints are imposed on size and weight. Many different optical arrangements capable of meeting the above-stated performance criteria are known. Recently, a market demand has arisen for wearable displays, especially for wearable displays having a configuration similar to a pair of eyeglasses. Such displays are called eyeglass displays. An eyeglass display may be connected to a portable computer, a portable television receiver, a portable Digital Versatile Disk (DVD) player, or other generator of a video signal to provide the user with a highly private, high-quality display of data or entertainment. An eyeglass display may also form part of a virtual reality system.

To maximize user comfort and for aesthetic reasons, an eyeglass display should have the lowest-possible weight and bulk. To reduce the weight and bulk of the eyeglass display, the display element that generates the pictures for viewing by the user is very small and is located much closer to the user's eye than a comfortable viewing distance. Consequently, the user cannot view the display element directly. Instead, an optical imaging system must be interposed between the display element and the user's eye. The optical imaging system gathers light from the display element and directs the light into the user's eye. The optical imaging system forms a magnified image of the display element at a comfortable viewing distance from the user's eye. The magnification provides the image an apparent size comparable with that of a large-screen computer monitor at a conventional viewing distance (about 50 cm). To minimize the weight and bulk of the eyeglass display, the weight and bulk of the optical imaging system must also be minimized. Requiring that the weight and bulk of the optical imaging system be minimized and that the optical imaging system also be very simple to manufacture greatly increases the challenge of designing an optical imaging system that additionally meets the performance criteria set forth above.

Other types of miniature display, such as electronic viewfinders for electronic still and motion picture cameras, have performance requirements similar to eyeglass displays.

FIG. 1 shows a plan view of an example of a conventional optical imaging system 10. The optical imaging system 10 is used in a helmet-mounted display system and performs substantially the same function as the optical imaging system of an eyeglass display system. The optical imaging system 10 is composed of the plane mirrors 12 and 14, the 50—50 beam splitter 16, the concave mirror 18 and the four lenses 20, 22, 24 and 25. The image plane 26 is laterally displaced from the user's eye located at or near the exit pupil 28. Light diverging from the image plane passes through the lens 20, reflects from the mirror 12, passes though the lenses 22, 24 and 25, is reflected by the mirror 18, is partially reflected by the beam splitter 16, is reflected and converged by the concave mirror 18 and is transmitted through the beam splitter to the exit pupil. This arrangement forms an upright, enlarged image of the object located at the image plane. To meet the performance requirements set forth above, the eight major components constituting the optical imaging system 10 must be accurately located relative to one another in terms of both position and rotation about at least two axes. Moreover, the lenses 20 and 22 are preferably doublets, as shown, to reduce chromatic aberration.

The conventional optical imaging system 10 has a number of performance shortcomings. It has limited field of view. When the object located at the image plane 26 is a display element that has to be externally illuminated, the bulk of the optical imaging system has to be substantially increased. If the display element is a transmissive display element, the back illumination system that illuminates the display element increases the bulk of the optical imaging system. If the display element is a reflective display element, the need to provide sufficient clearance between the display element and the lens 20 to accommodate the illumination system increases the bulk of the optical imaging system. The conventional optical imaging system is incapable of accommodating compact reflective illumination optics, and separate illumination optics must be provided. Finally, the conventional optical imaging system locates the display element at a point level with the user's eye, but horizontally displaced therefrom by a substantial distance. The resulting width of the optical imaging system causes the eyeglass display to obstruct a substantial portion of the user's peripheral vision.

Other known optical imaging system suffer from similar or additional problems.

What is needed, then, is an optical imaging system that has the lowest-possible weight and bulk, and that forms a high-resolution, low-distortion image of an object and locates the image at a comfortable viewing distance from the user=s eye. When used in an eyeglass display, the optical imaging system should form an image having an apparent size comparable with that of a large-screen computer monitor at a conventional viewing distance, and should locate the image at a comfortable viewing distance. The optical imaging system should also be capable of operating with both reflective and transmissive display elements.

SUMMARY OF THE INVENTION

The invention provides a compact optical imaging system that transmits light received from an object located at an image plane to an exit pupil to form an image. The optical imaging system comprises a first prism, a second prism, a converging reflective element, and a converging transmissive element. The first prism includes a first face, a second face and a third face. The third face faces the image plane. The included angle between the first face and the second face of the first prism is $\alpha$. The second prism includes a first face facing the exit pupil and substantially parallel to the first face of the first prism, and a second face adjacent the second face of the first prism. The converging reflective element is adjacent the first face of the first prism. The converging transmissive element is either on or adjacent the first face of the second prism. The included angle α between the first face and the second face of the first prism lies in a range in which light originating at the exit pupil passes through the converging transmissive element, the second prism and the first prism, is reflected by the converging reflective element back into the first prism, is reflected at the second face of the first prism, is totally internally reflected at the first face of the first prism, and passes through the third face of the first prism to the image plane.

The invention also provides a compact optical imaging system that comprises a first prism, a second prism, a converging reflective-refractive element and a converging diffractive optical element. The first prism includes a first face, a second face and a third face. The third face faces the image plane. The included angle between the first face and the second face of the first prism is α. The second prism includes a first face facing the exit pupil and substantially parallel to the first face of the first prism, and a second face adjacent the second face of the first prism. The converging reflective-refractive is element attached to the first prism, and includes a concave reflecting surface facing the first face of the first prism. The converging diffractive optical element is attached to or integral with the first face of the second prism.

The included angle α lies in the range $(\phi_c/2)<\alpha<\phi_c$, where $\phi_c$ is the critical angle of the material of the first prism.

The optical imaging system may additionally comprise an object carrier structured automatically to locate the object at a predetermined distance from the third face of the first prism and at a predetermined angular relationship to the third face of the first prism.

The object carrier may be structured to locate the object substantially parallel to the third face of the first prism.

The object carrier may additionally be structured to locate the object at an adjustable distance from the third face of the first prism to provide a correction for deficiencies in the user's vision.

Finally, the invention provides a method of making a compact optical imaging system. In the method, a first prism, a second prism and a converging reflective-refractive element including a concave reflective surface are provided. The first prism includes a first face, a second face and a third face. The included angle between the first face and the second face of the first prism is α. The second prism includes a first face, a second face, a third face and a diffractive optical element attached to or integral with the first face. The included angle between the first face and the second face of the second prism is also α.

The first prism is attached to the second prism with the second faces in contact and the first faces substantially parallel. The converging reflective-refractive element is attached to the first prism with the concave reflective surface facing the first face of the firm.

BRIEF DESCRIPTION OF THE DRAWINGS

FIG. 7A is a graph showing the modulation transfer function (MTF) of an example of the optical imaging system according to the invention.

FIG. 7B is a graph showing the astigmatism of an example of the optical imaging system according to the invention plotted against field angle.

FIG. 7C is a graph showing the distortion of an example of the optical imaging system according to the invention plotted against field angle.

DETAILED DESCRIPTION OF THE INVENTION

Figure 1:
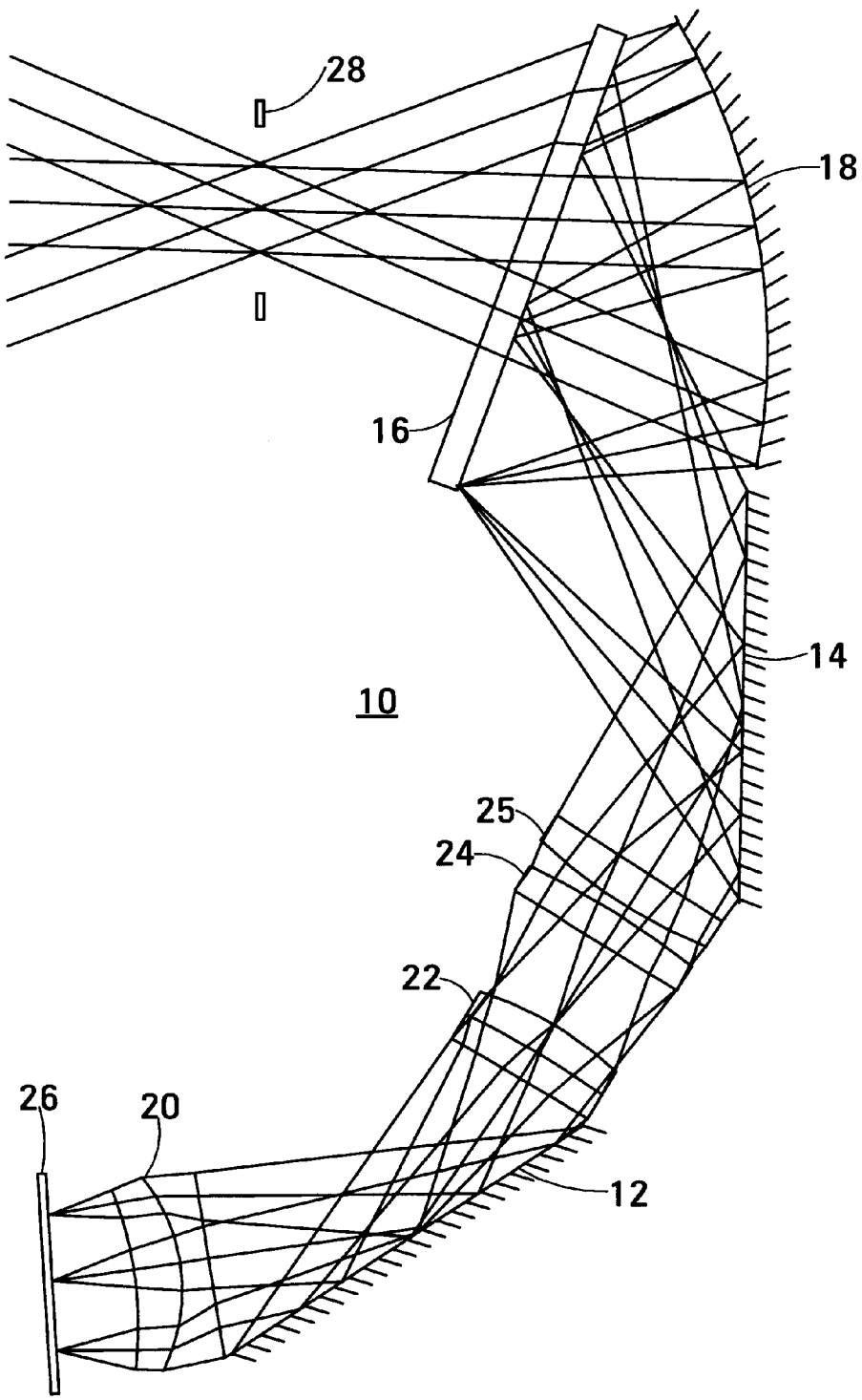
FIG. 1 is a plan view of an example of a conventional optical imaging system used in a helmet-mounted display system.
Figure 2:
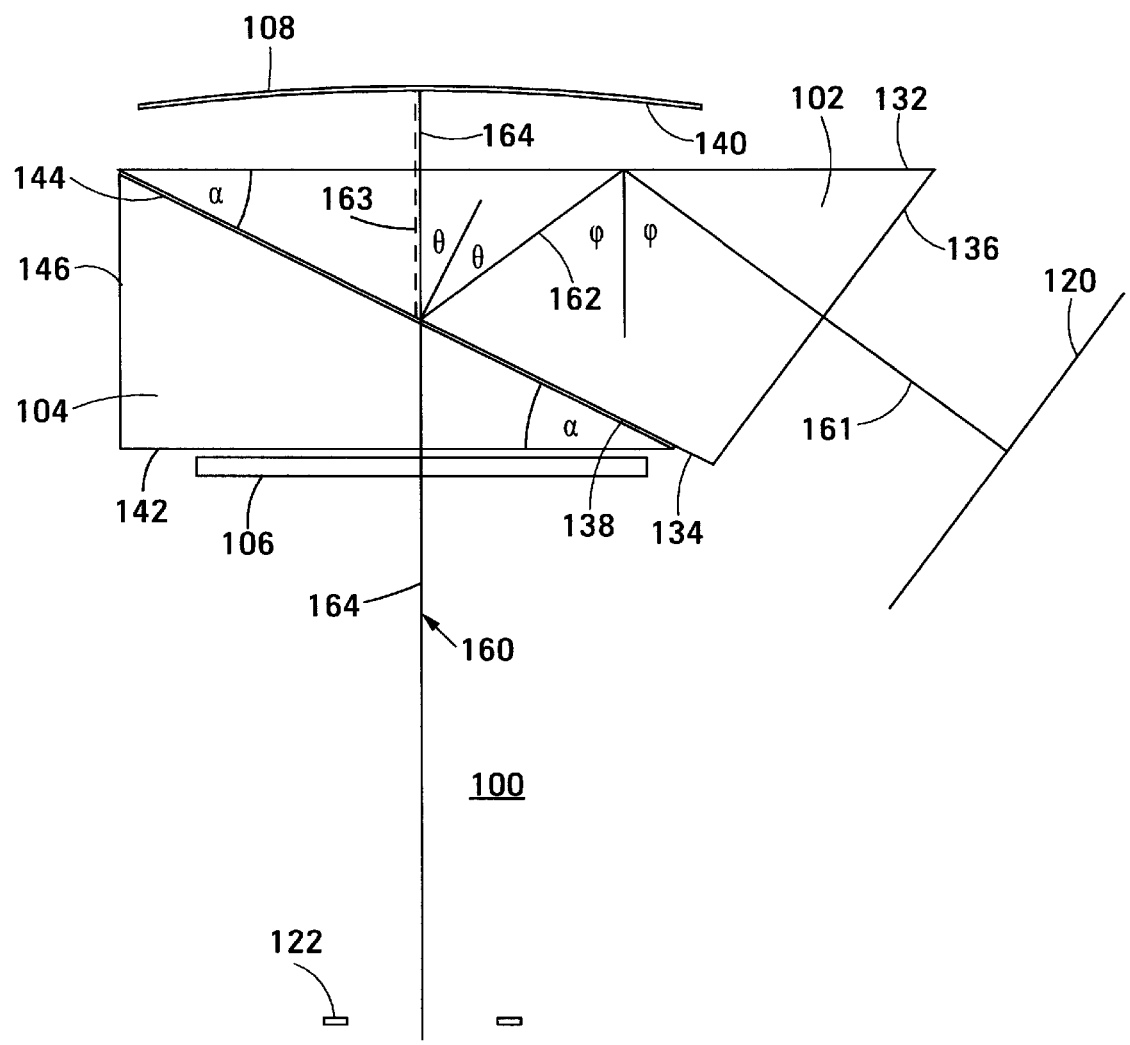
FIG. 2 is a schematic top view of a first embodiment of an optical imaging system according to the invention.

FIG. 2 is a schematic top view of a first embodiment 100 of a compact, light-weight optical imaging system according to the invention. The optical imaging system 100 is suitable for use in eyeglass displays and other types of miniature displays having similar performance requirements. The optical imaging system is composed of the first prism 102, the second prism 104, the converging transmissive element 106 and the converging reflective element 108. The optical imaging system 100 receives light from an object located at the image plane 120 and forms an upright, enlarged, virtual image of the object that can be perceived by the user's eye (not shown) located at or near the exit pupil 122. The optical imaging system can be configured to locate the image at any predetermined distance from the exit pupil. This distance can range from a conventional near point distance to infinity.

In the optical imaging system 100, the first prism 102 has a substantially triangular cross-section in the plane of the drawing, and includes a first face 132, a second face 134 and a third face 136. The included angle between the first face 132 and the second face 134 is α. The second face includes the semi-reflective layer 138. A dielectric coating deposited on the second face 134 by a suitable deposition process may be used as the semi-reflective layer.

The second prism 104 also has a substantially triangular cross-section in the plane of the drawing and includes a first face 142, a second face 144, and a third face 146. The included angle between the first face 142 and the second face 144 of the second prism is also substantially equal to α. The semi-reflective layer 138 may be included in the second face 144 instead of the second face 134. However, it is normally simpler to manufacture the optical imaging system if the semi-reflective layer and the converging transmissive element 106 are included in different elements. Thus, it is preferred to include the semi-reflective layer in the second face of the first prism 102.

The second prism 104 is located adjacent the first prism 102 with the second face 144 in contact with the second face 134. The prisms are oriented such that the third face 136 is opposite the third face 146. This aligns the first face 132 substantially parallel to the first face 142. Preferably, the second prism is attached to the first prism by a thin layer of an optical adhesive (not shown) applied between the second face 144 and the semi-reflective layer 138.

In one embodiment of the optical imaging system 100, the first prism 102 is a glass prism made of type BK7 glass sold by Schott Glass Technologies, Inc., of Duryea, Pa. This glass has a refractive index of 1.520. The second prism 104 is a plastic prism molded in an acrylic plastic having a refractive index of 1.496. Suitable acrylic plastics may be obtained from many vendors, for example, Plaskolite, Inc., of Columbus, Ohio. Molding the second prism in an acrylic plastic substantially reduces the weight and mass-production cost compared with a glass prism, and also allows the converging transmissive element 106 to be manufactured as part of the second prism, as will be described below. Glass was the original choice of material for the first prism because, at the time, it was easier to obtain the flatness required of the first face 132, at which total internal reflection occurs, in glass than in plastic.

Recently, it has become possible to obtain molded plastic prisms having surfaces with the required flatness. Consequently, plastic is now the preferred material for both prism 102 and prism 104. However, the choice of materials is not critical to the invention. Both prisms can be glass prisms, both prisms can be plastic prisms, or a mixture of a glass prism and a plastic prism can be used. Moreover, both prisms can have the same refractive index.

In the optical imaging system 100, the optical axis 160 is folded, and includes the axis portions 161, 162, 163 and 164. The axis portion 164 extends perpendicularly from the first face 132 of the first prism 102, and is also perpendicular to the first face 142 of the second prism 104. The axis portion 163 extends perpendicularly from the center of the reflective surface 140 of the reflective converging element 108 to the second face 134 of the first prism 102. The axis portion 163 is depicted by a broken line laterally offset from the axis portion 164 to enable the axis portion 163 to be shown. In practice, the axis portion 163 overlaps part of the axis portion 164. The axis portion 162 extends between the second face 134 and the first face 132 of the first prism. The axis portion 161 extends perpendicularly from the image plane 120 to the first face 132 of the first prism, and is also perpendicular to the third face 136.

The converging reflective element 108 is centered on, and is perpendicular to, the axis portion 164 and is located adjacent the first face 132 of the first prism 102. The converging transmissive element 106 is centered on, and is perpendicular to, the axis portion 164. The converging transmissive element is located adjacent or on the first face 142 of the second prism 104. In embodiments in which the converging transmissive element is located on the first face 142, the converging transmissive element may be integral with the first face 142, or may be an independent element attached to the first face 142, as will be described in detail below with reference to FIG. 3A. The converging reflective element and the converging transmissive element collectively constitute a two-element magnifying system that forms the upright, virtual image of an object located at an image plane.

A conventional spherical or aspherical lens, which is preferably a compound lens to reduce chromatic aberration, may be used as the converging transmissive element 106. A conventional spherical or parabolic mirror may be used as the converging reflective element 108. Preferably, a diffractive optical element is used as the converging transmissive element 106 and a converging reflective-refractive element is used as the converging reflective element 108, as will be described below with reference to FIG. 3A.

The image plane 120 is located several centimeters from the converging optical elements 106 and 108 to enable the optical imaging system 100 to provide the necessary magnification. To locate the image plane at such a distance from the converging optical elements with a minimum adverse effect on the bulk of the optical imaging system 100, the part of the optical axis 160 between the image plane 120 and the reflective converging element 108 is folded. The folded part of the optical axis is composed of the axis portions 161–163.

The geometry of the optical axis 160 between the image plane 120 and the exit pupil 122 can be more easily understood by a description of the path of a narrow beam of light travelling in the reverse direction along the optical axis from the exit pupil 122 to the image plane 120. Such light passes from the exit pupil along the axis portion 164 through the converging transmissive element 106 and the second prism 104. A fraction of the light, typically 50%, passes through the semi-reflective layer 138, and passes along the axis portion 164 through the first prism 102 to the converging reflective element 108.

The light is reflected by the converging reflective element 108 and passes along the axis portion 163 through the first prism 102 to the second face 134 of the first prism. As noted above, the axis portion 163 overlaps part of the axis portion 164 and is depicted as a broken line laterally offset from the solid line that represents the axis portion 164.

In the first prism 102, the angle a between the first face 132 and second face 134 is less the critical angle $\phi_c$ of the material of the first prism, but is greater than half the critical angle, i.e., $(\phi_c/2) < \alpha < \phi_c$. Geometrical analysis shows that the angle of incidence θ on the second face 134 of the first prism 102 of the light travelling along the axis portion 163 is equal to α. Since the angle of incidence on the second face 134 is less than the critical angle, the light passes through the second face 134 to the semi-reflective layer 138.

A fraction of the incident light travelling along the axis portion 163 is reflected by the semi-reflective layer 138 back into the first prism 102 along the axis portion 162. This light travels towards the first face 132 of the first prism. Geometrical analysis shows that the angle of incidence φ on the first face 132 of the first prism is equal to α. Since the critical angle of the material of the first prism is less than 2α, the incident light is totally internally reflected at the first face, and travels through the first prism along the axis portion 161.

The preferred angle between the third face 136 and the first face 132 of the first prism 102 is 2α. This angular relationship aligns the third face perpendicular to the axis portion 161, which maximizes light transmission through the third face. The angle between the third face and the first face may be different from 2α, but this makes the design of the optical imaging system 100 considerably more complex.

The image plane 120 is centered on, and is perpendicular to, the axis portion 161. Consequently, the image plane is parallel to the third face 136 of the first prism 102.

A second embodiment 200 of an optical imaging system according to the invention will now be described with reference to FIGS. 3A, 3B and 4. Elements of the embodiment shown in FIGS. 3A, 3B and 4 that correspond to elements of the embodiment shown in FIG. 2 are indicated using the same reference numerals and will not be described in detail here.

Figure 3A:
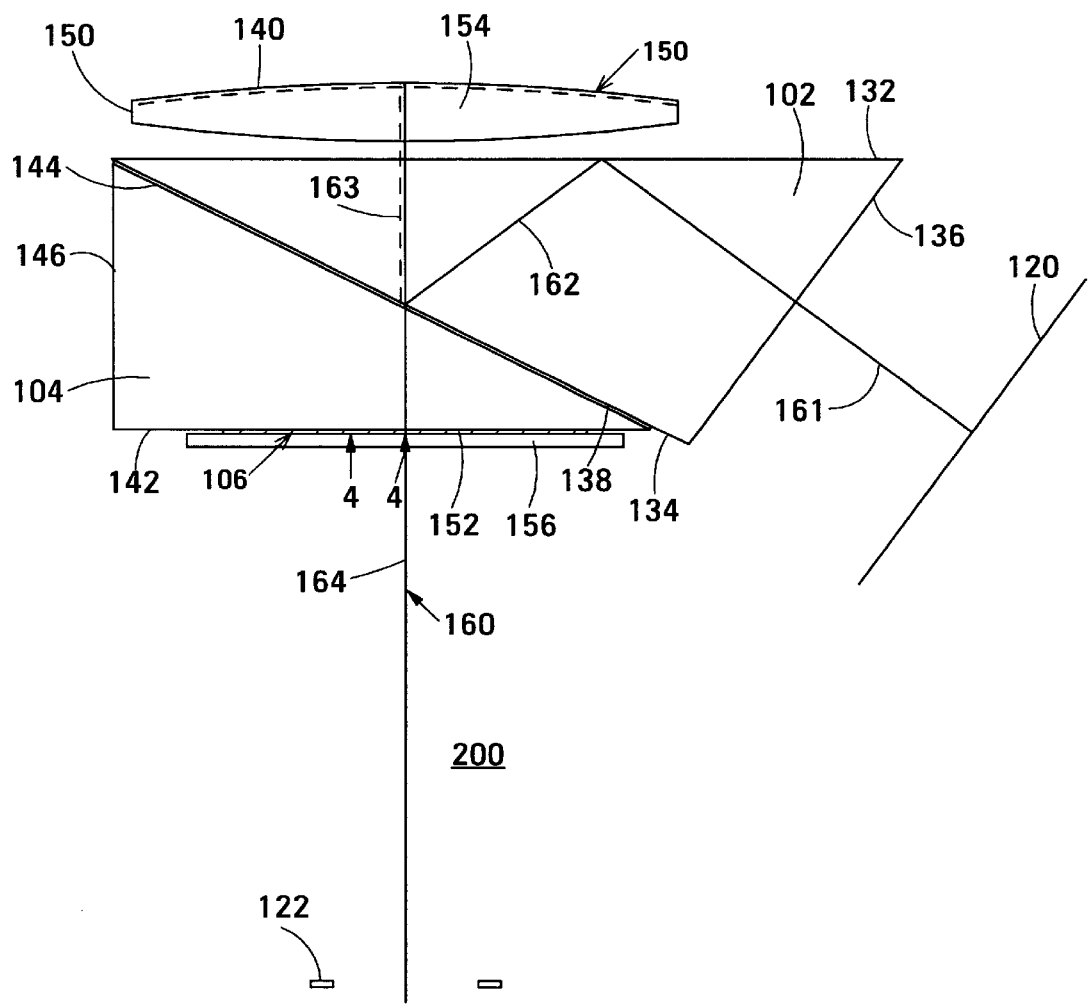
FIG. 3A is a top view of a second embodiment of an optical imaging system according to the invention.
Figure 4:
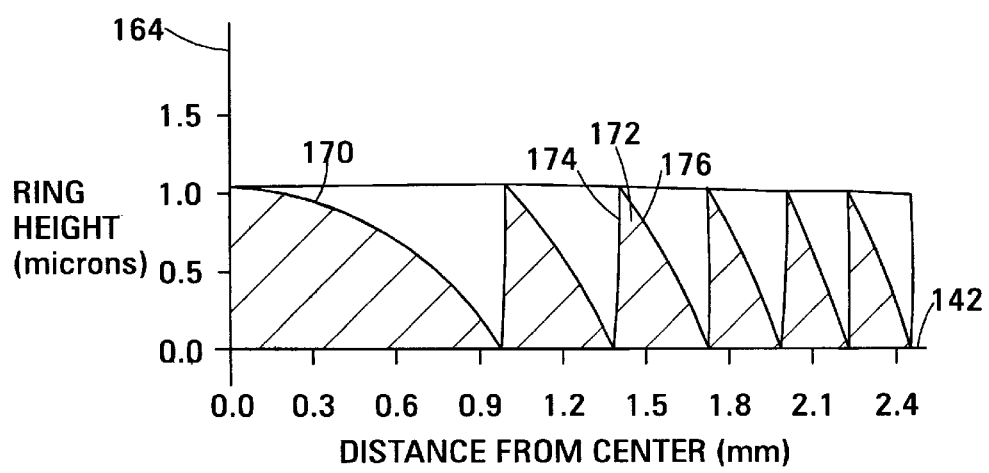
FIG. 4 is a cross-sectional view of part of the diffractive optical element taken along the section line 4—4 in FIG. 3A.

In the optical imaging system 200 shown in FIG. 3A, the converging reflective-refractive element 150 is used as the converging reflective element 108 and the diffractive optical element 152 is used as the converging transmissive element 106. Compared with a conventional mirror and conventional lens, the reflective-refractive element and the diffractive optical element reduce the weight and bulk of the optical imaging system according to the invention. The reflective-refractive element and the diffractive optical element also simplify the manufacture of the optical imaging system. The diffractive optical element can be attached to the first face 142 of the second prism 104, which simplifies manufacture, and alternatively can be integral with the first face 142, as shown in FIG. 3A, which further simplifies manufacture. For example, the diffractive optical element can be formed integrally with the first face 142 during molding of the second prism. The reflective-refractive element can be easily attached to the first prism 102, as will be described in more detail below with reference to FIGS. 5A–5C, which also simplifies manufacture of the optical imaging system.

The reflective-refractive element 150 is composed of the bi-convex or concavo-convex lens 154, the convex surface of which is silvered to form the reflective surface 140. The reflective-refractive element has substantially less spherical aberration than a conventional concave mirror even though both its surfaces are spherical. The reflective-refractive element easier to fabricate than a conventional parabolic mirror because of its spherical surfaces. A Mangin mirror, known in the art, is one example of a converging reflective-refractive element.

In some applications of the optical imaging system 100, the reflectivity of the reflective surface 140 of the converging reflective-refractive element 150 is made as close to 100% as possible to maximize the efficiency with which the optical imaging system 100 transmits light from the object located at the image plane 120 to the user's eye (not shown) located near the exit pupil 122. In practice, a reflectivity as high as about 98% is achieved. In such embodiments, the reflective surface 140 is encapsulated with a suitable opaque sealant to protect the reflective surface. Other applications incorporate an embodiment of the optical imaging system 100 that superimposes the image of the object on a view of the user's environment. In such an embodiment, the reflectivity of the reflective surface 140 is made substantially less than 100%, e.g., about 50%, to allow light from the user's environment to pass through the reflective-refractive element 150. The convex lens 154 forming part of the reflective-refractive element and the diffractive optical element 152 collectively form an image of the user's environment on which the image of the object located at the image plane 120 is superimposed. In this case, a transparent sealant is used to protect the reflective surface 140.

Diffractive optical elements are known in the art. A diffractive optical element can be designed that is only a few millimeters thick and that provides converging lens-like characteristics. A diffractive optical element is therefore considerably smaller and lighter than an equivalent conventional lens, and is cheaper to mass-produce. Computer programs are commercially available that can be used to design the location and size of the topological features called rings that provide the diffractive optical element with its desired optical properties. With such programs, the designer can precisely define the location, size and shape of the rings so that the wave fronts that emerge from the diffractive optical element are precisely shaped to provide the desired optical performance. In the preferred embodiment, the topology of the rings constituting the diffractive optical element 152 is designed to provide the required converging characteristics and additionally to provide characteristics that correct the chromatic aberration and the residual spherical aberration of the reflective-refractive element 150.

The diffractive optical element 152 can be fabricated as a flexible or rigid thin-film element. The element that includes the diffractive optical element can be attached to the first face 142 of the second prism 104 using a suitable index-matched adhesive. Alternatively, and preferably, when the second prism 104 is fabricated by molding, the topological features of the diffractive optical element may be defined in the part of the mold that defines the first face 142. This way, the diffractive optical element is fabricated in the same manufacturing process as the second prism. Fabricating the diffractive optical element integrally with the first face of the second prism minimizes the cost of the diffractive optical element and eliminates the need to perform any alignment between the diffractive optical element and the second prism.

The diffractive optical element 152 is composed of a number of concentric rings projecting from or recessed into a surface. In the example shown in FIG. 3A, the rings project from the first face 142 of the second prism 104. A cross-sectional view of part of the diffractive optical element is shown in FIG. 4, in which the height of the rings is greatly exaggerated to enable the rings to be depicted clearly. The diffractive optical element includes the convex center ring 170 and multiple outer rings, an exemplary one of which is shown at 172. Each outer ring has an approximately triangular cross section, with a radially-inner face 174 substantially parallel to the axis portion 164 and a sloping radially-outer face 176. The spacing between adjacent rings decreases with increasing distance from the axis portion. In the preferred embodiment, the maximum height of the rings above the first face 142 was 1.0352 μm, the number of rings was 40 and the minimum spacing between adjacent rings 51 μm.

Returning now to FIG. 3A, the diffractive optical element is protected by the protection plate 156. The protection plate is a thin piece of flat optical glass with parallel major surfaces that covers the diffractive optical element 152. The protection plate is attached to the first face 142 of the second prism 104 with one of its major surfaces in contact with the diffractive optical element. The protection plate is attached to the first face 142 by a suitable adhesive applied to points on the protection plate or the first face 142 located outside the outer periphery of the diffractive optical element.

Figure 3B:
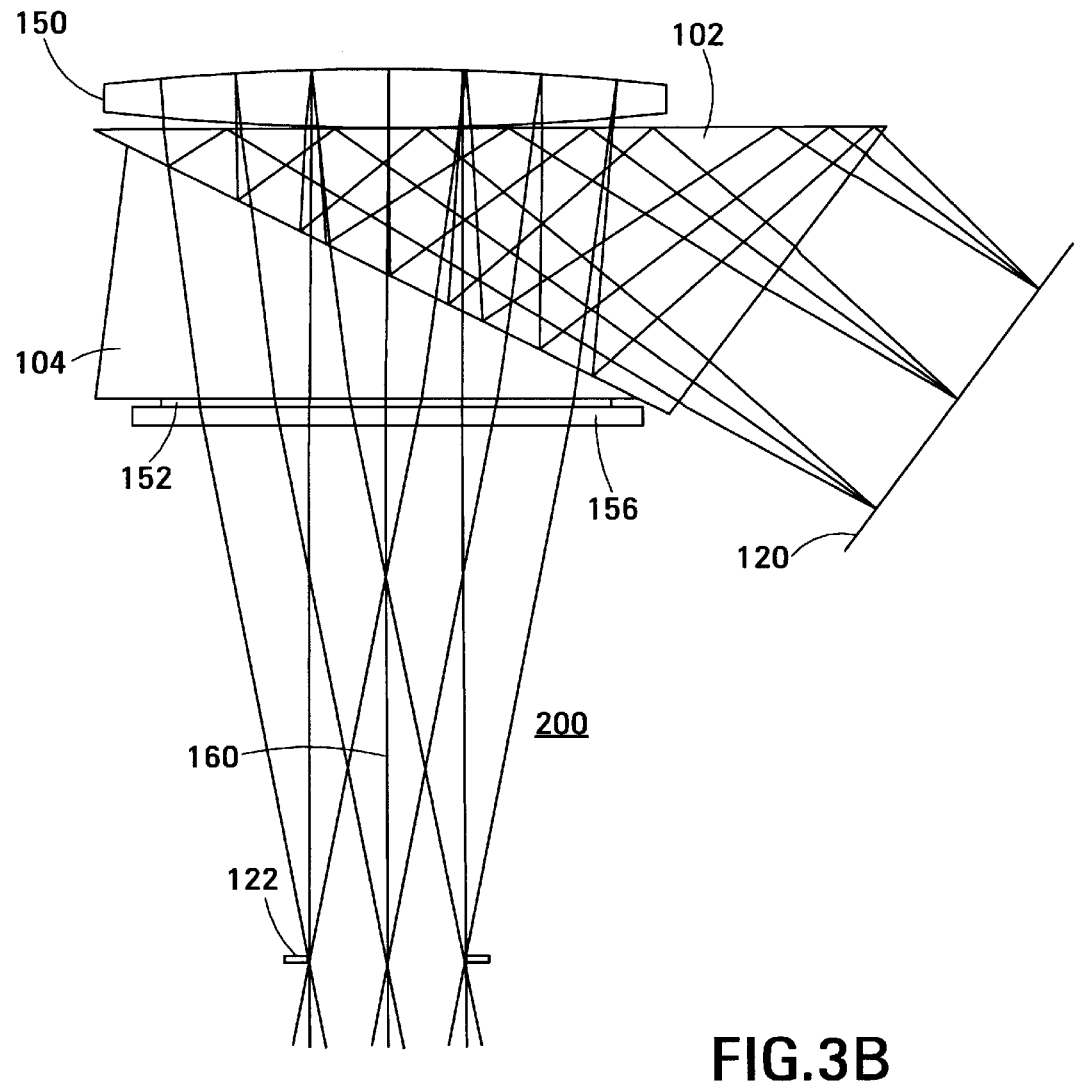
FIG. 3B shows the paths through the embodiment of the optical imaging system shown in FIG. 3A of light rays originating at three different angles from each of three different locations on the image plane.

FIG. 3B shows the paths through the optical imaging system 100 of light rays originating at three different angles from each of three different locations on the image plane 120. Light from the object located on the image plane passes through the third face 136 into the first prism 102, where it is totally internally reflected at the first face 132 and is reflected by the semi-reflective layer 138 included in the second face 134 before passing through the first face 132 to the reflective-refractive element 150. The light is reflected and converged by the reflective-refractive element and passes back into the first prism through the first face 132. The light then passes through the first prism, the semi-reflective layer 138 and the second prism 104. The light passes out of the second prism through the first face 142, where it its further converged by the diffractive optical element 152. The light then passes to the user's eye (not shown) located near the exit pupil 122.

Figure 5A:
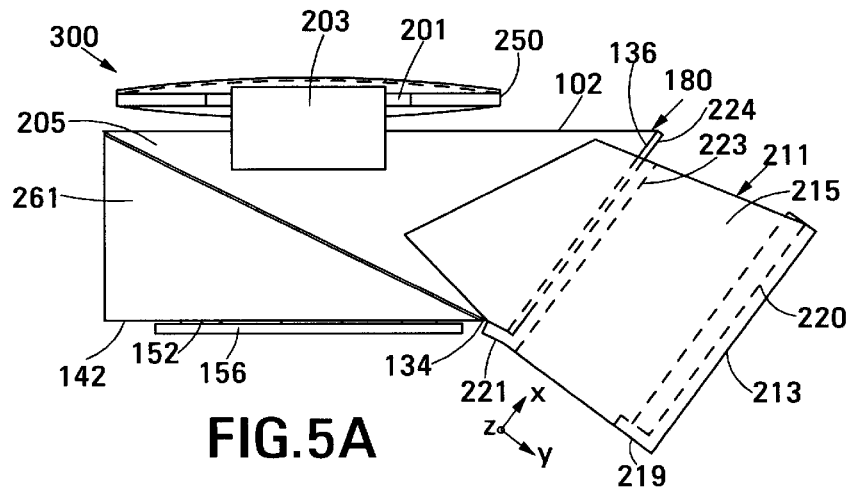
FIGS. 5A, 5B and 5C are respectively a top view, front view and back view of a third embodiment of an optical imaging system according to the invention.
Figure 5B:
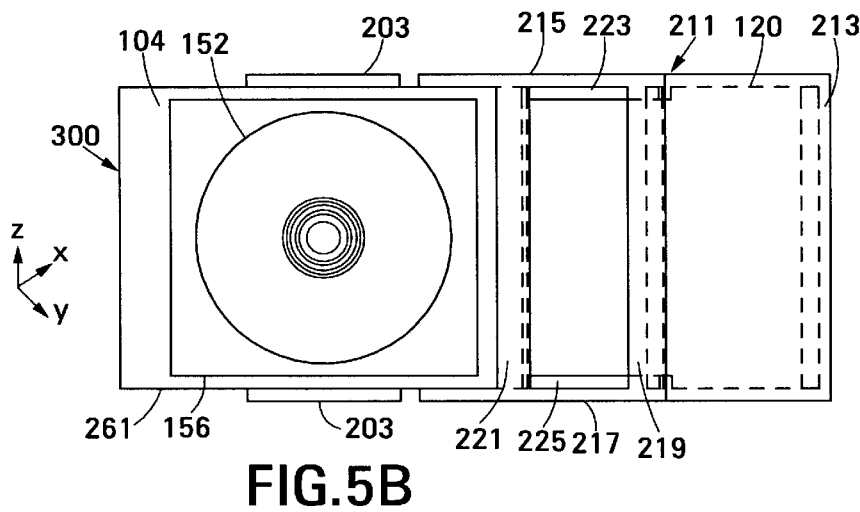
Figure 5C:
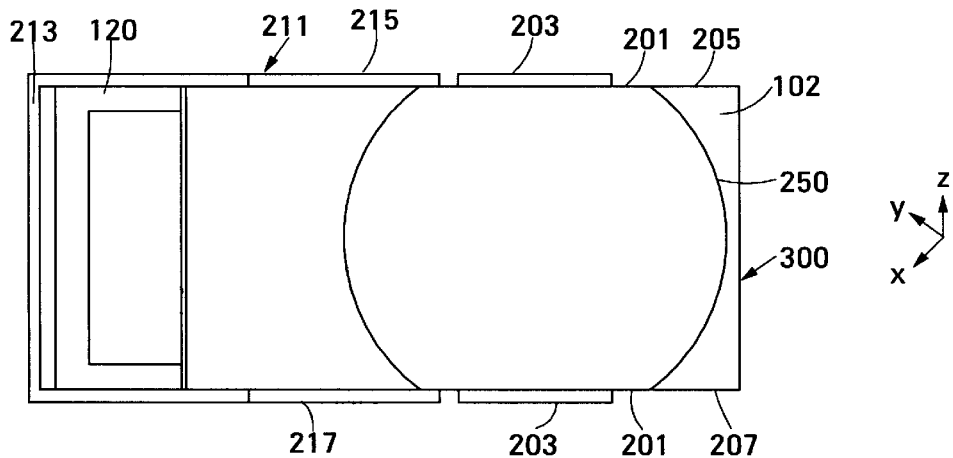

FIGS. 5A, 5B and 5C are respectively a top view, front view and back view of third embodiment 300 of an optical imaging system according to the invention. The optical imaging system 300 is shown as forming part of one-half of an eyeglass display in which the optical imaging system forms a magnified image of the display element 220 located at the image plane. A complete eyeglass display includes two optical imaging systems that are mirror images of one another. One optical imaging system is located in front of each of the user's eyes. The portion of the eyeglass display shown in FIGS. 5A–5C is that located in front of the user's right eye.

The optical imaging system 300 forms a magnified, upright, virtual image of the display element 220 located at the image plane. An illuminator (not shown) illuminates the display element with polarized light. Each pixel of the display element selectively rotates the direction of polarization of the light. In the optical imaging system 300, the third face 136 of the first prism 102 is shown as including the optional polarizer 224. The illumination system includes a polarization analyzer that converts the selective rotations of the direction of polarization of the light received from the display element into intensity variations. The polarizer 224 serves as auxiliary polarization analyzer to increase the dynamic range of the intensity variations. The polarizer 224 may be omitted if it is not required.

In the eyeglass display application, the optical imaging system 300 is configured to locate the image of the display element 220 at about one meter from the exit pupil. This distance is somewhat larger than the normal viewing distance of a conventional computer monitor, but is a comfortable viewing distance for an eyeglass display. The dimensions of the display element are approximately 12.3 mm in the horizontal direction by 9.2 mm in the vertical direction. As used in connection with the display element 220, the words horizontal and vertical are used in the same sense in which they are used in connection with television and video displays. The optical imaging system generates a magnified image of the display element having an apparent size comparable to that of a large-screen monitor at a conventional viewing distance.

Elements of the embodiment 300 shown in FIGS. 5A–5C that correspond to elements of the embodiments shown in FIGS. 2 and 3A are indicated by the same reference numerals and will not be described again in detail. The rings further from the center of the diffractive optical element 152 than those shown have been omitted from FIG. 5A to simplify the drawing.

In the optical imaging system 300, the reflective-refractive element 250 is shaped to include the side surfaces 201. The side surfaces are flat surfaces disposed parallel to one another at opposite ends of a diameter of the reflective-refractive element. An attachment ear 203 is attached to each of the side surfaces 201. The attachment ears may be attached to the side surfaces using a suitable adhesive, for example. The attachment ears overlap the sides 205 and 207 of the first prism 102, as shown in FIG. 5C.

Before the reflective-refractive element 250 is aligned relative to the diffractive optical element 152 located on the second prism 104, as will be described below, an adhesive (not shown) is applied between each of the attachment ears 203 and the corresponding side 205 and 207 of the first prism 102. When the alignment of the reflective-refractive element is complete, the adhesive is cured to secure the reflective-refractive element in the correct positional and angular relationship to the diffractive optical element located on the first face 142 of the second prism 104.

The optical imaging system 300 additionally includes the display element carrier 211. The display element carrier is structured to automatically locate the display element 220 in the required positional and angular relationship to the first prism 102. The display element carrier may be a separate element as shown, or may be integral with the housing of the eyeglass display that includes the display element and the optical imaging system.

The display element carrier 211 is a substantially U-shaped element composed of the mounting platform 213 connecting the side-pieces 215 and 217. The distance in the z-direction shown in FIG. 5A between the inside surfaces of the side pieces facing the sides 205 and 207 of the first prism 102 is equal to, or larger by a few microns than, the distance between the sides of the first prism. The mounting platform includes the outer lip 219. The outer lip is substantially perpendicular to both the mounting platform and the side pieces and extends between the side pieces.

The display element 220 is affixed to the mounting platform 213 in a predetermined position relative to the display element carrier 211 in three dimensions. The position of the display element is defined in the x-direction by the outer lip 219, in the y-direction by the mounting platform and in the z-direction by the side pieces 215 and 217. In embodiments in which the display element is narrower than the distance between the side pieces, the mounting platform may include additional lips running parallel to the side pieces. The lips have opposed surfaces separated by a distance equal to or slightly greater than the width of the display element in the z-direction.

The display element carrier 211 is affixed to the first prism 102 in a predetermined position relative thereto in all three dimensions. The display element carrier includes the inner lip 221 and the side rails 223 and 225. The inner lip is perpendicular to the side pieces 215 and 217, extends between the side pieces, and has an inside surface that engages with the second face 134 of the first prism 102. This engagement defines the position of the display element carrier relative to the first prism in the x-direction.

The side rails 223 and 225 extend inwardly and perpendicularly from the side pieces 215 and 217, respectively, and extend along the side pieces parallel to the mounting platform 213. The side rails each have a surface disposed parallel to the mounting platform. The surfaces of the side rails engage with the polarizer 224 included in the third face 136 of the first prism 102. This engagement defines the position of the display element carrier 211 relative to the first prism in the y-direction.

As noted above, the distance between the inside surfaces of the side pieces 215 and 217 is within a few microns of the distance between the sides 205 and 207 of the first prism 102. Engagement between the side pieces and the sides of the first prism defines the position of the display element carrier 211 relative to the first prism in the z-direction.

Thus, attaching the display element carrier 211 to the first prism 102 with the inner lip 221 in contact with the second face 134, the side rails 223 and 225 in contact with the polarizer 224 included in the third face 136 and the side pieces substantially in contact with the sides 205 and 207 automatically defines the position of the display element carrier relative to the first prism in all three dimensions. Since the display element carrier also automatically defines the position of the display element 220 relative to it in all three dimensions, as noted above, the display carrier automatically defines the position of the display element relative to the optical imaging system 300.

As noted above, the mounting platform 213, the side pieces 215 and 217, the outer lip 219, the inner lip 221 and the side rails 223 and 225 of the display element carrier 211 can be integral with or supported by the housing (not shown) of the eyeglass display that includes the optical imaging system 300 and the display element 220. In this case, the display element 220 is mounted on the portion of the housing constituting the mounting platform 213 with part of the display element abutted against the portion of the housing constituting the outer lip 219. An optical sub-assembly 180 composed of the first prism 102, the second prism 104, the diffractive optical element 152 and the reflective-refractive element 150 is mounted in the housing with the second face 134 abutting the portion of the housing constituting the inner lip 221, the polarization analyzer 124 included in the third face 136 abutting the portions of the housing constituting the side rails 223 and 225, and the sides 205 and 207 of the first prism 102 abutting the portions of the housing constituting the side pieces 215 and 217, respectively. With the display element and the optical sub-assembly engaged with the housing as just described, the housing automatically defines the position of the display element relative to the optical imaging system.

In the eyeglass display shown in FIGS. 5A–5C, the optical imaging system 300 forms an image of the reflective display element 220. An illuminator (not shown) directs polarized light from a light source (not shown) towards the major surface of the reflective display element remote from the mounting platform 213. The reflective display element selectively rotates the polarization of this light, and the reflected light passes through the polarizer 224 into the optical imaging system. A suitable reflective display element is described in U.S. patent applications Ser. Nos. 09/070,487 and 09/070,669, the disclosures of which are incorporated herein by reference. An illuminator that incorporates a parabolic reflector and that is sufficiently compact to fit into the display element carrier 211 in the space between the display element 220 and the first prism 102 is described in U.S. patent application Ser. No. 09/139,962, the disclosure of which is also incorporated herein by reference.

The optical imaging system 300 shown in FIGS. 5A–5C requires little modification to incorporate a transmissive display element instead of the reflective display element shown. To accommodate a transmissive display element, the mounting platform 213 is configured to include a window through which polarized light from the illuminator (not shown) passes to illuminate the surface of the transmissive display element adjacent the mounting platform. The transmissive display element selectively rotates the direction of polarization of the light it transmits, and the transmitted light passes through a polarization analyzer (not shown) and the optional polarizer 224 into the first prism 102 through the third face 136.

When the optical imaging system 300 is used with a transmissive display element, the characteristics of the reflective-refractive element 150 and of the diffractive optical element can be changed to allow the transmissive display element to be located closer to the third face 136 of the first prism 102 than the reflective display element 220. Moving the transmissive display element closer to the third face allows the illuminator and the first prism 102 to be located on opposite sides of the transmissive display element without significantly increasing in the bulk of the eyeglass display incorporating the optical imaging system 300.

A major advantage of the optical imaging system according to the invention is that it is composed of only four optical components. Moreover, in preferred embodiments, two of the four optical components, namely, the second prism 142 and the diffractive optical element 152, are integrated to form a single optical component Such integration occurs when the diffractive optical element is formed on part of the first face 142 of the second prism, or when the diffractive optical element is attached to the first face of the second prism in a predetermined location. Integration of the second prism and the diffractive optical element further simplifies manufacturing the optical imaging system according to the invention because only three optical components have to be optically aligned with one another.

The optical imaging systems according to the invention may be assembled as follows. The first prism 102 is angularly aligned relative to the second prism 104 carrying the diffractive optical element 152, and is then attached to the second prism. Next, the reflective-refractive element 150 is aligned positionally and angularly relative to the diffractive optical element and the prisms and is then attached to the first prism. The angular alignments are performed optically and the positional alignment is performed by setting the distance between reference surfaces to a predetermined value. Assembly of embodiments of the optical imaging system that include a display element carrier is completed by attaching the display element carrier 211 to the first prism 102 to automatically position the display element 220 relative to the first prism.

Figure 6A:
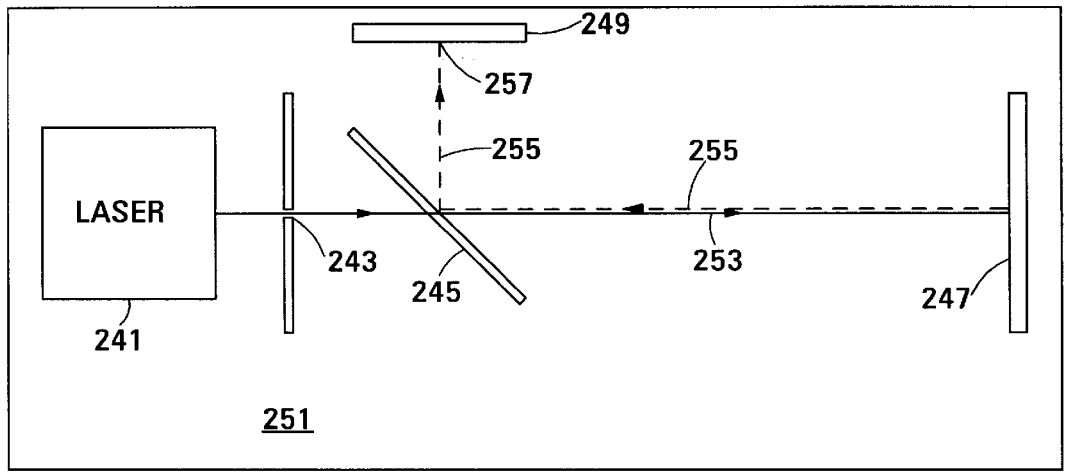
FIG. 6A is a schematic drawing showing an example of an alignment arrangement that may be used to perform alignments in the method according to the invention of making the optical imaging system according to the invention.
Figure 6B:
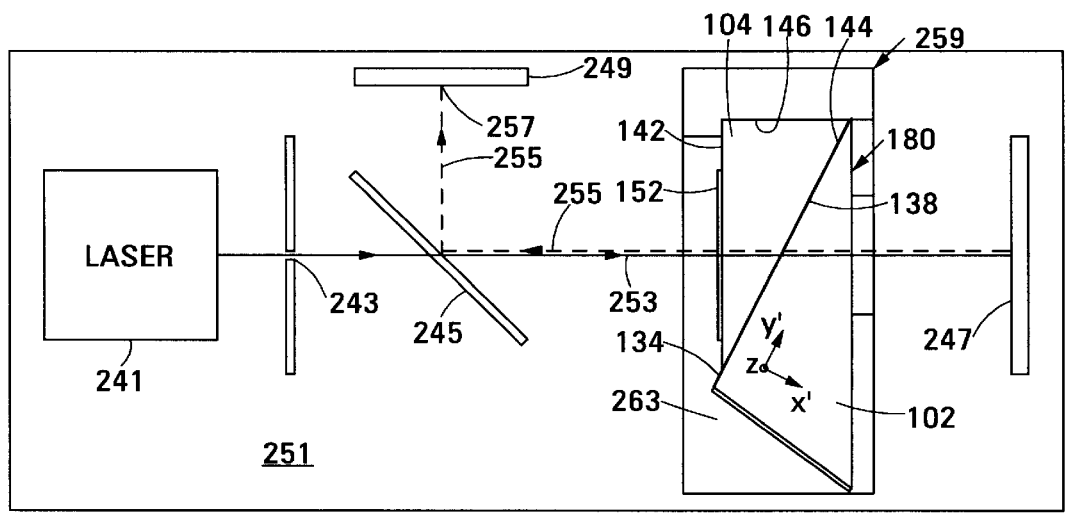
FIG. 6B illustrates aligning the first prism with respect to the second prism in the method according to the invention of making the optical imaging system according to the invention.
Figure 6C:
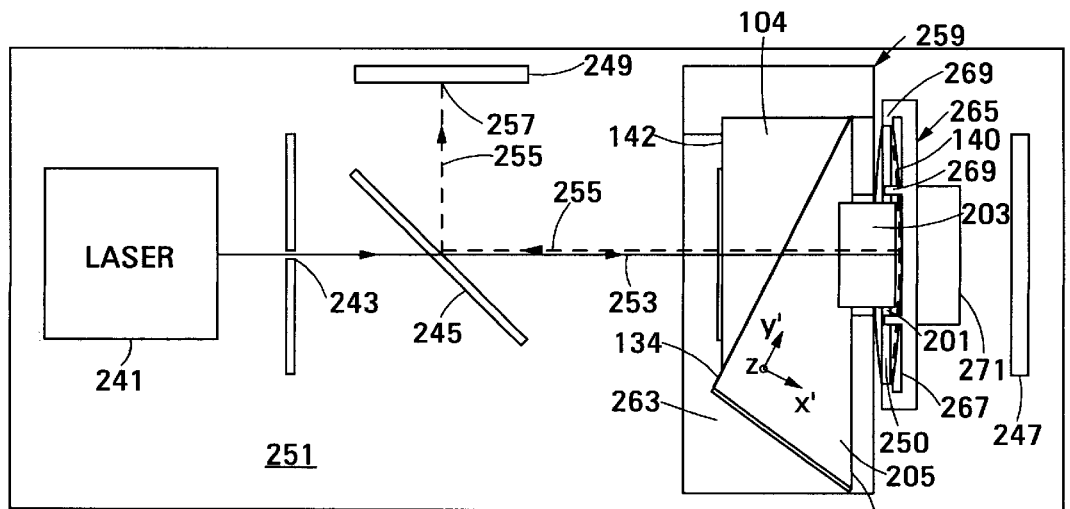
FIG. 6C illustrates aligning the reflective-refractive element with respect to the first prism and the second prism in the method according to the invention of making the optical imaging system according to the invention.

FIGS. 6A, 6B and 6C illustrate a process that may be used to assemble the optical imaging system according to the invention. The alignment process can be carried out using the alignment arrangement shown in FIG. 6A. The alignment arrangement is composed of the laser 241, the pinhole 243, the beam splitter 245, the plane mirror 247 and the black screen 249. These elements are mounted on the optical bench 251 or on a similar device capable accurately defining the positions of these elements relative to one another. The laser is preferably a helium-neon laser.

Initially, the beam splitter 245 is omitted. Light generated by the laser 241 passes through the pinhole 243 and is reflected by the mirror 247 back towards the pinhole. The light 253 travelling towards the mirror is indicated by a solid line and the light 255 reflected by the mirror is indicated by a broken line. The broken line is drawn laterally offset from the solid line to enable the broken line to be shown. In practice, the light beams overlap when the mirror is correctly aligned. The mirror is aligned so that the reflected light 255 passes back through the pinhole into the laser. The beam splitter 245 is then introduced. The beam splitter is aligned at about 45° to the light 255 to direct the light 255 towards the black screen 249. The light 255 forms a spot on the black screen. The position 257 of the spot is marked as a reference point.

The second prism 104 carrying the diffractive optical element 152 is then introduced into the optical path between the beam splitter 245 and the mirror 247, as shown in FIG. 6B. The second prism is mounted on the platform 259 for the alignment operation. The platform is mounted on the optical bench 251. The platform is structured to locate the second prism in a position that accurately centers the diffractive optical element 152 on the light 253 and that sets the first face 142 of the second prism perpendicular to the light 253. To define the position and angular alignment of the second prism, the platform includes three reference surfaces that engage with the first face 142, the third face 146 and the side 261 (see FIG. 5B) of the second prism. A coat of an optical adhesive (not shown) is applied to the second face 144 of the second prism.

The first prism 102 is then introduced into the optical path between the beam splitter 245 and the mirror 247. The second face 134 of the first prism is placed adjacent the second face 144 of the second prism 104 to place the semi-reflective layer 138 included in the second face 134 in contact with the second face 144, and to place the side 205 (see FIG. 5C) of the first prism in contact with the reference surface 263 of the platform 259. The alignment between the first prism and the second prism in the y'-direction shown in FIG. 6B is relatively uncritical. However, any angular error about the x'-axis makes the first face 132 of the first prism not parallel to the first face 142 of the second prism. These faces not being parallel causes the light 255 to return to a position on the black screen 249 different from the reference position 257. If the spot on the black screen caused by the light 255 is at a position different from the reference position after the prisms have been introduced into the optical path, the angular position of the first prism about the x'-axis is adjusted to restore the spot to the reference position. When this condition is met, the first face 132 of the first prism is accurately parallel to the first face 142 of the second prism, and the optical adhesive is cured.

The reflective-refractive element 250 with the attachment ears 203 already attached thereto is then introduced into the optical path between the first prism 102 and the mirror 247, as shown in FIG. 6C. The attachment ears are coated with a layer of a suitable adhesive. Prior to its introduction into the optical path, the reflective-refractive element 250 is mounted in the mount 265. The mount includes a reference surface 267 that contacts the reflective surface 140 of the reflective-refractive element, and additionally includes the gripping elements 269 that engage portions of the periphery of the reflective-refractive element, including the side surfaces 201. The reference surface 267 and the gripping elements collectively define the position of the reflective-refractive element relative to the mount 265 in all three dimensions. The mount is mounted on the platform 271 located on the optical bench 251. The platform locates the mount in a position that accurately centers the reflective-refractive element on the light beam 253. The angular position of the mount 265 relative to the platform 271 is adjustable about the y'- and z-axes.

The platform 271 is advanced along the optical bench 251 until the reference surface 267 of the mount 265 is located at a predetermined distance from the platform 259. The predetermined distance may be determined mechanically, by interferometry, or in other suitable ways. When this condition is met, the reflective surface 140 is located at a predetermined distance from the first face 142 of the second prism 104. This sets the reflective-refractive element 250 at the design distance from the diffractive optical element 152. When the reflective-refractive element is located at its design distance from the diffractive optical element, the is attachment ears 203 overlap the sides 205 and 207 of the first prism 102 (side 207 is shown in FIG. 5C), and the adhesive applied to the attachment ears fills the gap between the attachment ears and the sides of the first prism.

Any angular error between the reflective-refractive element 250 and the first face 142 of the second prism 104 causes the light 255 to return to a position on the black screen 249 different from the reference position 257. If the light 255 forms a spot on the black screen in a position different from the reference position 257 after the reflective-refractive element has been introduced into the optical path, the angular position of the mount 265 is adjusted about the y'- and z-axes shown in FIG. 5C to restore the spot to the reference position. When this condition is met, the normal to the center of the reflective surface 140 of the reflective-refractive element is aligned accurately parallel to the light 253. When the adjustment is complete, the optical adhesive between the attachment ears 203 and the sides of the first prism is cured.

The optical imaging system according to the invention provides a high-quality image in a small package. In the embodiment 300 shown in FIGS. 5A–5C, which is configured to operate with a 12.3 mm×9.2 mm display element 220 with XGA resolution (1024×768 pixels), the first face 132 of the first prism 102 is about 33 mm long. This embodiment of the optical imaging system can have a diagonal field of view as wide as 28°. The optical imaging system has a flat field curvature, so requires no eye accommodation. The optical imaging system provides an excellent image quality as a result of its high modulation transfer function (MTF), low astigmatism and low distortion, as illustrated in FIGS. 7A–7C, which show measurements taken an example of the optical imaging system according to the invention. FIG. 7A shows the modulation transfer function of the example at the diffraction limit and three different field angles. In this, modulation is plotted against spatial frequency. FIG. 7B is an astigmatic field curve in which the focus shift due to astigmatism is plotted against the field angle. FIG. 7C is a distortion curve in which distortion is plotted against the field angle.

In the embodiment 300 of the optical imaging system, the eye relief between the user's eye and the diffractive optical element 152 is about 25 mm. This is a relatively large value for the eye relief, and enables the user to wear eyeglasses when using the eyeglass display incorporating the optical imaging system. However, the optical imaging system can be modified to correct moderate defects in the user's vision to save the user from having to wear conventional eyeglasses when using the eyeglass display incorporating the optical imaging system.

The optical imaging system 300 according to the invention is configured to form the image of the display element 220 about one meter from the exit pupil. Users with presbyopia (long sightedness) may not perceive the image located at this distance as being perfectly sharp. The optical imaging system according to the invention can easily be configured additionally to provide a correction for deficiencies in the user's vision. This correction is provided by making the distance between the display element 220 and the third face 136 of the first prism 102 adjustable. Changing this distance by 1 mm provides a correction of approximately one diopter. Making the distance between the display element and the third face adjustable can also provide a correction for deficiencies in the user's vision in embodiments that form the image at other distances, such as at the typical near point distance or at infinity.

Figure 8A:
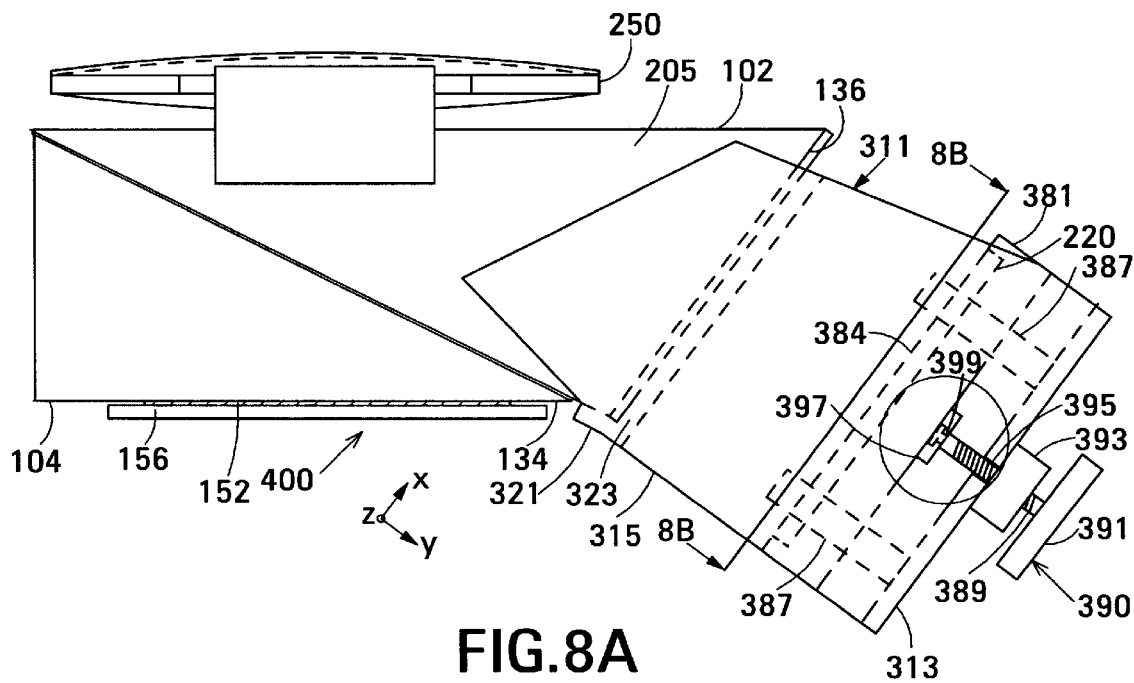
FIG. 8A is a top view of a fourth embodiment of an optical imaging system according to the invention in which the distance between the display element and the first prism is adjustable to provide a correction for deficiencies in the user's vision.
Figure 8B:
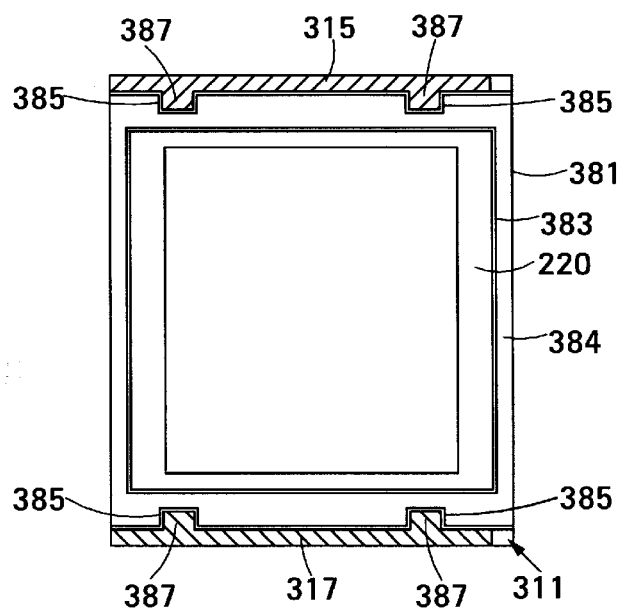
FIG. 8B is a cross-sectional view of the display element carrier taken along the section line 8B—8B in FIG. 8A.

FIGS. 8A and 8B show a fourth embodiment 400 of the optical imaging system according to the invention. In this embodiment, the distance between the display element 220 and the third face 136 of the first prism 102 is adjustable to provide a correction for deficiencies in the user's eyesight.

Elements of the embodiment shown in FIGS. 8A and 8B that correspond to elements of the embodiments shown in FIGS. 2, 3A and 5A–5C are indicated using the same reference numerals and will not be described again in detail.

In the embodiment shown in FIGS. 8A and 8B, the display element carrier 311 is a U-shaped structure substantially similar to the display element carrier 211 shown in FIGS. 5A–5C. The display element carrier includes the side pieces 315 and 317 and the bottom piece 313. The side rails 323 and 325 project inwardly from the side pieces 315 and 317 in an arrangement similar to the side rails 223 and 225 in the embodiment shown in FIGS. 5A–5C. The side rail 325 cannot be seen in the views shown FIGS. 8A and 8B. The inner lip 321 extends between the side pieces. The side rails, the side pieces and the inner lip collectively define the positional relationship between the first prism 102 and the display element carrier 311 in all three dimensions, as described above.

The display element carrier 311 additionally includes the display element tray 381 in which the display element 220 is mounted. One major surface 384 of the display element tray is shaped to define the recess 383 having dimensions similar to those of the display element. The recess defines the position of the display element relative to the display element tray in all three dimensions in a manner similar to that in which the position of the display element is defined in the embodiment shown in FIGS. 5A–5C. The display element tray is slidably mounted between the side pieces 315 and 317 with the recess 383 facing the side rails 323 and 325. The display element tray is slidably mounted in a way that permits it to move freely in the y-direction but maintains it in a fixed position in the x- and z-directions and maintains it accurately parallel to the side rails, and, hence, to the third face 136 of the first prism 102.

In the example shown, the display element tray 381 is slidably mounted between the side pieces 315 and 317 by shaping each of the sides of the display element tray adjacent the side pieces to define at least one groove 385 and by shaping each of the side pieces 315 and 317 to include an inwardly-projecting guide 387 corresponding in shape, position and dimensions to each groove. Each guide is shaped and dimensioned in the cross-sectional plane shown in FIG. 8B to engage snugly with its corresponding groove. The grooves are shown as having a rectangular cross-sectional shape, but may alternatively have other suitable cross-sectional shapes. The grooves extend perpendicularly to the major surface of the display element tray in which the recess 383 is defined. The guides extend up the side pieces from the bottom piece 313 in a direction perpendicular to the side rails 323 and 325, i.e., in the -y-direction. The guides may alternatively be separate elements attached to the side pieces. The location and direction of the guides and the engagement of the guides in the grooves allows the display element tray 381 to move freely in the y-direction but maintains the display element tray in a fixed position in the x- and z-directions and maintains the display element parallel to the side rails 323 and 325 at all positions in the y-direction.

Other suitable mechanisms that can be used for mounting the display element tray 381 and that permit the display element to move freely in the y-direction but maintain the display element in a fixed position in the x- and z-directions and maintain the display element accurately parallel to the side rails 323 and 325 are known in the art and may be used instead of the arrangement shown.

In the example shown in FIGS. 8A and 8B, the position of the display element tray 381 in the y-direction is set by the adjusting screw arrangement 390 shown in FIG. 8A. Part of the side piece 315 is cut away in FIG. 8A to show parts of the adjusting screw arrangement more clearly.

In the adjusting screw arrangement 390, the adjusting screw 389 is threaded and is fitted on one end with the adjusting knob 391. The threads of the adjusting screw engage with the threaded bush 393 affixed to the center of the bottom piece 313. The adjusting screw extends through the hole 395 in the bottom piece. The end of the adjusting screw remote adjusting knob engages in the bush 397 attached to the underside of the display element tray 381. The adjusting screw can rotate relative to the bush 397. The groove 399 near the end of the adjusting screw engages with the bush 397 so that any movement of the adjusting screw in the y-direction imparts an equal movement in this direction on the bush 397, and, hence, on the display element tray 381.

The user adjusts the optical imaging system 400 to his or her eyesight by rotating the adjusting knob 391. Rotating the adjusting knob rotates the adjusting screw 389. The rotation of the adjusting screw is transformed by the threaded bush 393 into movement in the y-direction of the adjusting screw relative to the threaded bush. The movement of the adjusting screw moves the display element tray 381 in the y-direction, as described above. The direction in which the user rotates the adjusting knob determines whether the display element tray moves towards or away from the side rails 323 and 325 and, hence, from the third face 136 of the first prism 102.

In a practical embodiment, range of movement of the display element tray 381 in the y-direction is about 2.5 mm, which provides an eyesight adjustment of over two diopters.

The optical imaging system according to the invention has been described mainly with reference to an embodiment used in a miniature eyeglass display. However, the optical imaging system according to the invention can be used in other applications that require a compact, light-weight, high-performance optical imaging system that is easy to manufacture.

Although this disclosure describes illustrative embodiments of the invention in detail, it is to be understood that the invention is not limited to the precise embodiments described, and that various modifications may be practiced within the scope of the invention defined by the appended claims.

I claim:

1. A compact optical imaging system that transmits light received from an object located at an image plane to an exit pupil to form an image, the optical imaging system comprising:
   a first prism including a first face, a second face and a third face, the third face facing the image plane, the first prism having an included angle α between the first face and the second face;
   a second prism including:
      a first face facing the exit pupil and substantially parallel to the first face of the first prism, and
      a second face adjacent the second face of the first prism;
   a converging reflective element adjacent the first face of the first prism; and
   a converging transmissive element one of (a) on, and (b) adjacent, the first face of the second prism, in which:
   the included angle α lies in a range in which light originating at the exit pupil passes through the converging transmissive element, the second prism, and the first prism, is reflected by the converging reflective element back into the first prism, is reflected at the second face of the first prism, is totally internally reflected at the first face of the first prism, and passes through the third face of the first prism to the image plane.

2. The compact optical imaging system of claim 1, in which the included angle α lies in a range $(\phi_c/2)<\alpha<\phi_c$, where $\phi_c$ is the critical angle of the material of the first prism.

3. The compact optical imaging system of claim 1, in which the converging transmissive element includes a diffractive optical element.

4. The compact optical imaging system of claim 3, in which the diffractive optical element is integral with the first face of the second prism.

5. The compact optical imaging system of claim 1, in which the converging reflective element includes a reflective-refractive element.

6. The compact optical imaging system of claim 5, in which the reflective-refractive element includes a convex face facing the first face of the first prism.

7. The compact optical imaging system of claim 5, in which the reflective-refractive element has a reflectivity of about 50%.

8. The compact optical imaging system of claim 1, in which the reflective-refractive element has a reflectivity of about 100%.

9. The compact optical imaging system of claim 1, additionally comprising a reflective layer interposed between the second face of the first prism and the second face of the second prism.

10. The compact optical imaging system of claim 9, in which the reflective layer is included in the second face of the first prism.

11. The compact optical imaging system of claim 1, additionally comprising an object carrier structured automatically to locate the object at a predetermined distance from the third face of the first prism and at a predetermined angular relationship to the third face of the first prism.

12. The compact optical imaging system of claim 11, in which the object carrier is structured to locate the object substantially parallel to the third face of the first prism.

13. The compact optical imaging system of claim 11, in which the object carrier is additionally structured to locate the object at an adjustable distance from the third face of the first prism.

14. A compact optical imaging system that transmits light received from an object located at an image plane to an exit pupil to form an image, the optical imaging system comprising:
    a first prism including a first face, a second face and a third face, the third face facing the image plane, the first prism having an included angle α between the first face and the second face;
    a second prism including:
        a first face facing the exit pupil and substantially parallel to the first face of the first prism, and
        a second face adjacent the second face of the first prism;
    a converging reflective-refractive element attached to the first prism, the reflective-refractive element including a concave reflecting surface facing the first face of the first prism; and
    a converging diffractive optical element one of (a) attached to, and (b) integral with, the first face of the second prism.

15. The compact optical imaging system of claim 14, in which the included angle α lies in a range in which light originating at the exit pupil passes through the diffractive optical element, the second prism, and the first prism, is reflected by the converging reflective-refractive element back into the first prism, is reflected at the second face of the first prism, is totally internally reflected at the first face of the first prism, and passes through the third face of the first prism to the image plane.

16. The compact optical imaging system of claim 14, in which the included angle α lies in a range $(\phi_c/2)<\alpha<\phi_c$, $\phi_c$ being the critical angle of the material of the first prism.

17. The compact optical imaging system of claim 14, additionally comprising an object carrier structured automatically to locate the object at a predetermined distance from the third face of the first prism and at a predetermined angular relationship to the third face of the first prism.

18. The compact optical imaging system of claim 17, in which the object carrier includes:
    an object tray;
    a mechanism that mounts the object tray to allow the object tray to move freely in a y-direction towards and away from the third face of the first prism but maintains the object in a fixed position in x- and z-directions mutually orthogonal to the y-direction and maintains the predetermined angular relationship between the object and the third face.

19. A method of making a compact optical imaging system that transmits light received from an object located at an image plane to an exit pupil to form an image, the method comprising:
    providing:
        a first prism including a first face, a second face and a third face, the first prism having an included angle α between the first face and the second face,
        a second prism, including:
            a first face, a second face and a third face, the second prism having an included angle α between the first face and the second face; and
            a diffractive optical element one of (a) attached to, and (b) integral with, the first face, and
        a converging reflective-refractive element including a concave reflective surface;
    attaching the first prism to the second prism with the second faces in contact and the first faces substantially parallel; and
    attaching the converging reflective-refractive element to the first prism with the concave reflective surface facing the first face of the first prism.

20. The method of claim 19, additionally comprising mounting the compact optical imaging system with the first face of the second prism facing the exit pupil and the third face of the first prism facing the image plane.

21. The method of claim 19, in which attaching the first prism to the second prism includes:
    providing a laser, a plane mirror, a beam splitter and a black screen;
    aligning the mirror absent the beam splitter to return light emitted by the laser to the laser, the light defining a first axis;
    interposing the beam splitter between the laser and the mirror to direct light reflected by the mirror to the black screen;
    noting a reference position of the light on the black screen;

inserting the first prism and the second prism between the beam splitter and the mirror with the first face of the second prism accurately perpendicular to the light and the a diffractive optical element centered on the light; and rotating the first prism about an axis perpendicular to the second face of the second prism to return the light on the black screen to the reference position.

22. The method of claim 19, in which attaching the converging reflective-refractive element to the first prism includes:

inserting the reflective-refractive element between the first prism and the mirror;

moving the reflective-refractive element along the first axis to locate the reflective surface of the reflective-refractive element a predetermined distance from the first face of the second prism; and rotating the reflective-refractive element about two axes mutually perpendicular to the first axis to return the light on the black screen to the reference position.

* * * * *